(12) United States Patent
Shiono et al.

(10) Patent No.: US 8,092,583 B2
(45) Date of Patent: *Jan. 10, 2012

(54) INK SET

(75) Inventors: Shohei Shiono, Shiojiri (JP); Tsuyoshi Sano, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 63 days.

This patent is subject to a terminal disclaimer.

(21) Appl. No.: 12/539,084

(22) Filed: Aug. 11, 2009

(65) Prior Publication Data

US 2010/0043670 A1 Feb. 25, 2010

(30) Foreign Application Priority Data

Aug. 25, 2008 (JP) ................................ 2008-215056

(51) Int. Cl.
C09D 11/02 (2006.01)

(52) U.S. Cl. ...................................................... 106/31.6

(58) Field of Classification Search .................. 106/31.6
See application file for complete search history.

(56) References Cited

U.S. PATENT DOCUMENTS

| | | | |
|---|---|---|---|
| 5,236,498 A | 8/1993 | Zaloum et al. | |
| 5,811,213 A | 9/1998 | Chiba | |
| 5,846,306 A * | 12/1998 | Kubota et al. | 106/31.75 |
| 5,958,129 A | 9/1999 | Urban et al. | |
| 6,336,721 B1 | 1/2002 | Provost et al. | |
| 6,419,733 B1 | 7/2002 | Sano et al. | |
| 6,562,121 B2 | 5/2003 | Nickel et al. | |
| 6,713,531 B2 | 3/2004 | Iijima | |
| 6,802,893 B1 * | 10/2004 | Komatsu et al. | 106/31.6 |
| 6,835,242 B2 | 12/2004 | Nickel | |
| 6,843,840 B2 | 1/2005 | Kataoka et al. | |
| 6,846,353 B2 | 1/2005 | Sano et al. | |
| 6,849,110 B2 | 2/2005 | Sano | |
| 6,877,851 B2 | 4/2005 | Watanabe | |
| 6,924,327 B2 | 8/2005 | Sano et al. | |
| 7,015,259 B2 | 3/2006 | Kataoka | |
| 7,156,910 B2 | 1/2007 | Koganehira et al. | |
| 7,384,466 B2 | 6/2008 | Sano et al. | |
| 7,462,231 B2 * | 12/2008 | Koganehira et al. | 106/31.6 |
| 7,494,538 B2 * | 2/2009 | Koganehira et al. | 106/31.6 |
| 7,670,418 B2 | 3/2010 | Kato et al. | |
| 7,731,789 B2 | 6/2010 | Aoki et al. | |
| 7,844,667 B2 | 11/2010 | Ito et al. | |

(Continued)

FOREIGN PATENT DOCUMENTS

CN 1464900 12/2003

(Continued)

OTHER PUBLICATIONS

English Patent Abstract of Japan 2006-28281 Published Oct. 19, 2006.

(Continued)

*Primary Examiner* — Jerry A Lorengo
*Assistant Examiner* — Veronica F. Faison
(74) *Attorney, Agent, or Firm* — Ladas & Parry LLP

(57) ABSTRACT

An ink set includes a cyan ink composition containing C.I. pigment blue 15:6 or C.I. pigment blue 60 as a pigment and a magenta ink composition containing at least one quinacridone pigment selected from the group consisting of C.I. pigment violet 19, C.I. pigment red 122, C.I. pigment red 202, and C.I. pigment red 209, or a quinacridone solid solution pigment formed of at least two selected from the above group, as a pigment.

12 Claims, 1 Drawing Sheet

U.S. PATENT DOCUMENTS

| | | | |
|---|---|---|---|
| 2003/0029355 A1 | 2/2003 | Miyabayashi | |
| 2003/0097961 A1* | 5/2003 | Yatake et al. | 106/31.59 |
| 2003/0116055 A1 | 6/2003 | Kubota et al. | |
| 2004/0246321 A1 | 12/2004 | Takashima et al. | |
| 2005/0011403 A1 | 1/2005 | Mitina et al. | |
| 2005/0028429 A1 | 2/2005 | Schneidmiller | |
| 2005/0039632 A1 | 2/2005 | Yamamoto et al. | |
| 2005/0041082 A1 | 2/2005 | Kataoka | |
| 2005/0203210 A1 | 9/2005 | Kataoka et al. | |
| 2005/0235867 A1 | 10/2005 | Jackson et al. | |
| 2005/0284329 A1 | 12/2005 | Jackson et al. | |
| 2005/0284330 A1 | 12/2005 | Jackson | |
| 2006/0082629 A1 | 4/2006 | Kato et al. | |
| 2006/0232650 A1 | 10/2006 | Sugimoto et al. | |
| 2006/0268084 A1 | 11/2006 | Nishizaki et al. | |
| 2007/0002109 A1* | 1/2007 | Sato et al. | 347/100 |
| 2007/0097193 A1 | 5/2007 | Ma et al. | |
| 2007/0242118 A1* | 10/2007 | Koganehira et al. | 347/100 |
| 2007/0266887 A1* | 11/2007 | Koganehira et al. | 106/31.6 |
| 2009/0030144 A1* | 1/2009 | Mizutani et al. | 524/588 |
| 2009/0138566 A1 | 5/2009 | Ito et al. | |
| 2009/0142555 A1 | 6/2009 | Sano et al. | |
| 2009/0169834 A1 | 7/2009 | Sano et al. | |
| 2009/0181219 A1 | 7/2009 | Saito et al. | |
| 2009/0196995 A1 | 8/2009 | Saito et al. | |
| 2009/0297716 A1 | 12/2009 | Koganehira et al. | |
| 2009/0304927 A1* | 12/2009 | Kamibayashi et al. | 427/258 |
| 2009/0308279 A1* | 12/2009 | Koganehira et al. | 106/31.13 |
| 2009/0315962 A1 | 12/2009 | Kataoka | |
| 2009/0317606 A1 | 12/2009 | Kataoka | |
| 2009/0317607 A1 | 12/2009 | Kataoka | |
| 2010/0212543 A1 | 8/2010 | Shiono et al. | |

FOREIGN PATENT DOCUMENTS

| | | |
|---|---|---|
| DE | 69705904 T | 9/1997 |
| DE | 69828579 T | 7/1998 |
| EP | 0 778 321 | 6/1997 |
| EP | 0827039 A | 3/1998 |
| EP | 0851005 A | 7/1998 |
| EP | 0933406 A | 8/1999 |
| EP | 1 164 173 | 12/2001 |
| EP | 1 391 301 A1 | 2/2004 |
| EP | 1403334 A1 | 3/2004 |
| EP | 1457535 A1 | 9/2004 |
| EP | 1676893 A1 | 7/2006 |
| EP | 1741762 A1 | 1/2007 |
| EP | 1 811 003 | 7/2007 |
| EP | 1 908 806 | 4/2008 |
| JP | 08-123017 A | 5/1996 |
| JP | 10-123760 A | 5/1998 |
| JP | 10-219166 | 8/1998 |
| JP | 10-330640 A | 12/1998 |
| JP | 11-005230 | 1/1999 |
| JP | 11-166128 A | 6/1999 |
| JP | 2001-106951 A | 4/2001 |
| JP | 2002-030230 A | 1/2002 |
| JP | 2002-100959 A | 4/2002 |
| JP | 2003-123760 A | 4/2003 |
| JP | 2003-160750 A | 6/2003 |
| JP | 2003-253150 | 9/2003 |
| JP | 2003-268275 A | 9/2003 |
| JP | 2003-292835 A | 10/2003 |
| JP | 2003-313480 A | 11/2003 |
| JP | 2004-051881 A | 2/2004 |
| JP | 2004-276397 A | 7/2004 |
| JP | 2004-277585 A | 10/2004 |
| JP | 2004-314352 A | 11/2004 |
| JP | 2004-066558 A | 8/2005 |
| JP | 2004-246397 A | 8/2005 |
| JP | 2005-225955 A | 8/2005 |
| JP | 2005-225958 A | 8/2005 |
| JP | 2005-255959 | 9/2005 |
| JP | 2005-314546 A | 11/2005 |
| JP | 2005-120310 A | 12/2005 |
| JP | 2006-249335 | 9/2006 |
| JP | 2006-28281 | 10/2006 |
| JP | 2006-282802 | 10/2006 |
| JP | 2006-328140 | 12/2006 |
| JP | 2007-186641 | 7/2007 |
| WO | 99-05230 A | 2/1999 |
| WO | 02-100959 A | 12/2002 |
| WO | 2004-039900 A | 5/2004 |
| WO | 2006-004001 A | 1/2006 |
| WO | 2007-116868 A | 10/2007 |

OTHER PUBLICATIONS

English Patent Abstract of Japan 200-186641 Published Jul. 26, 2007.
Search Report in European Application 008011532.2, Feb. 18,2009.
Printout of Search in Registry Files of STN for Pigment Blue 15:6; 2 pages.
Search Report in European Application 07740853.2 Dated Mar. 17, 2011.
English Translation of Japanese Application 08-123017 A Published May 17, 1996.
English Translation of Japanese Application 10-219166 Published Aug. 18, 1998.
English Translation of Japanese Application 10-330640A Published Dec. 15, 1998.
English Translation of Japanese Application 11-005230A Published Jan. 12, 1999.
English Translation of Japanese Application 2002-030230A Published Jan. 31, 2002.
English Translation of Japanese Application 2002-100959A Published Apr. 5, 2002.
English Translation of Japanese Application 2003-1123760 Published Apr. 25, 2003.
English Translation of Japanese Application 2003-253150 Published Sep. 10, 2003.
English Translation of Japanese Application 2003-313480 Published Nov. 6, 2003.
English Translation of Japanese Application 2004-051881 Published Feb. 19, 2004.
English Translation of Japanese Application 2004-066558A Published Aug. 25, 2005.
English Translation of Japanese Application 2004-276397A Published Jul. 7, 2004.
English Translation of Japanese Application 2004-277585 Published Oct. 7, 2004.
English Translation of Japanese Application 2004-314352 A Published Nov. 11, 2004.
English Translation of Japanese Application 2005-225955 Published Aug. 25, 2005.
English Translation of Japanese Application 2005-225958 Published Aug. 25, 2005.
English Translation of Japanese Application 2005-255959 Published Sep. 22, 2005.
English Abstract of Japanese Application 2006-249335 A Published Sep. 21, 2006.
English Abstract of Japanese Application 2006-282802 Published Oct. 19, 2006.

* cited by examiner

INK SET

BACKGROUND

1. Technical Field

The present invention relates to an ink set having a wide color reproduction range (gamut), in particular, an ink set having a wide color reproduction range of a blue region in a dark portion.

2. Related Art

As a color model, a CIE/L*a*b* color system is known. According to the CIE/L*a*b* color system, any color (spectrum) in a visible light region that can be observed by human beings is able to be expressed by chromaticity coordinates.

In three parameters (L*, a*, and b*) of the CIE/L*a*b* color system, L* denotes luminance (brightness) of a color, and a* and b* denote chromaticity representing hue and saturation, respectively. Here, L*=0 means black, and L*=100 means white; a* means the position of a color between red and green, wherein a negative value represents green, and a positive value represents red; and b* means the position of a color between yellow and blue, wherein a negative value represents blue, and a positive value represents yellow. Since the L*a*b* color model is three-dimensional, a color space is expressed by a three-dimensional space, wherein the luminance is shown on the vertical axis.

However, the L*a*b* color model is only an index for conceptually explaining a color space, and the color reproduction range thereof has limitation. That is, for example, in the case that an image is formed on a recording medium using a pigment-based ink or ink set, there is a color that cannot be reproduced by the colors of the L*a*b* color model.

At the same time, ink compositions containing various pigments having high chromogenicity have been proposed. JP-A-2006-282810 discloses that an ink having high chromogenicity and being excellent in ink reliability such as ejection stability, storage stability, and clogging can be obtained by an ink composition containing a quinacridone solid solution pigment, a polyether-modified polydimethylsiloxane compound, and water. JP-A-2007-186641 discloses that an ink excellent in ink reliability such as printing quality, ejection stability, storage stability, and clogging can be realized by an ink composition containing a water-insoluble vinyl polymer, water, and a surface-treated pigment (yellow, magenta, or cyan) that is composed of a solid solution pigment formed of specific two or more pigments and has a hydrophilic dispersing group bonded to the surface thereof.

Incidentally, the color reproduction of a blue region in a dark portion, particularly, a region where the L* value is 20 or less, has limitation. That is, since it is difficult to exhibit chromaticity and saturation when the luminance is low, a color having an L* value of 20 or less and an a* value of 30 or more or a b* value of –75 or less in the CIE/L*a*b* color system, for example, a color of (L*, a*, b*)=(19.4, 30.0, –72.6) or (L*, a*, b*)=(19.4, 37.6, –76.8), cannot be reproduced on an image recording medium with liquid droplets (ink).

SUMMARY

An advantage of some aspects of the invention is to provide an ink set having a wide color reproduction range, in particular, an ink set having a wide color reproduction range of a blue region in a dark portion. Such a color could not been reproduced with known ink sets.

The present inventors have conducted intensive studies and have found the fact that an ink set composed of a combination of an cyan ink composition containing C.I. pigment blue 15:6 or C.I. pigment blue 60 as the pigment and a magenta ink composition containing a quinacridone-based pigment can extend the color reproduction range of a blue region in a dark portion having an L* value of 20 or less, in particular, the fact that an ink set composed of a combination of an cyan ink composition containing C.I. pigment blue 15:6 as the pigment and a magenta ink composition containing a quinacridone solid solution pigment can produce a color having an L* value of 20 or less, an a* value of 30 or more, and a b* value of –75 or less. Such a color could not been reproduced with known ink sets. Accordingly, the invention is as follows:

(1) An ink set including
a cyan ink composition containing C.I. pigment blue 15:6 or C.I. pigment blue 60 as a pigment, and
a magenta ink composition containing at least one quinacridone pigment selected from the group consisting of C.I. pigment violet 19, C.I. pigment red 122, C.I. pigment red 202, and C.I. pigment red 209, or a quinacridone solid solution pigment formed of at least two selected from the above group, as a pigment;
(2) The ink set according to the above (1), wherein the pigment contained in the magenta ink composition is a quinacridone solid solution pigment formed of at least two selected from the group consisting of C.I. pigment violet 19, C.I. pigment red 122, C.I. pigment red 202, and C.I. pigment red 209;
(3) The ink set according to the above (2), wherein the pigment contained in the magenta ink composition is a quinacridone solid solution pigment formed of C.I. pigment violet 19 and C.I. pigment red 202;
(4) The ink set according to the above (3), wherein the quinacridone solid solution pigment is formed such that the weight of the C.I. pigment violet 19 is larger than that of the C.I. pigment red 202;
(5) The ink set according to the above (3) or (4), wherein the quinacridone solid solution pigment is formed such that the weight ratio of the C.I. pigment violet 19 to the C.I. pigment red 202 is from 70/30 to 50/50;
(6) The ink set according to any one of the above (1) to (5), wherein the C.I. pigment violet 19 contained in the quinacridone solid solution pigment is a γ-type; and
(7) A recording apparatus including the ink set according to any of the above (1) to (6).

According to the ink set of the invention, a color having an L* value of 20 or less, an a* value of 30 or more, and a b* value of –75 or less in the CIE standard, which is a color that could not been reproduced with known ink sets, can be reproduced.

BRIEF DESCRIPTION OF THE DRAWINGS

The invention will be described with reference to the accompanying drawings.

DESCRIPTION OF EXEMPLARY EMBODIMENTS

Figure 1:
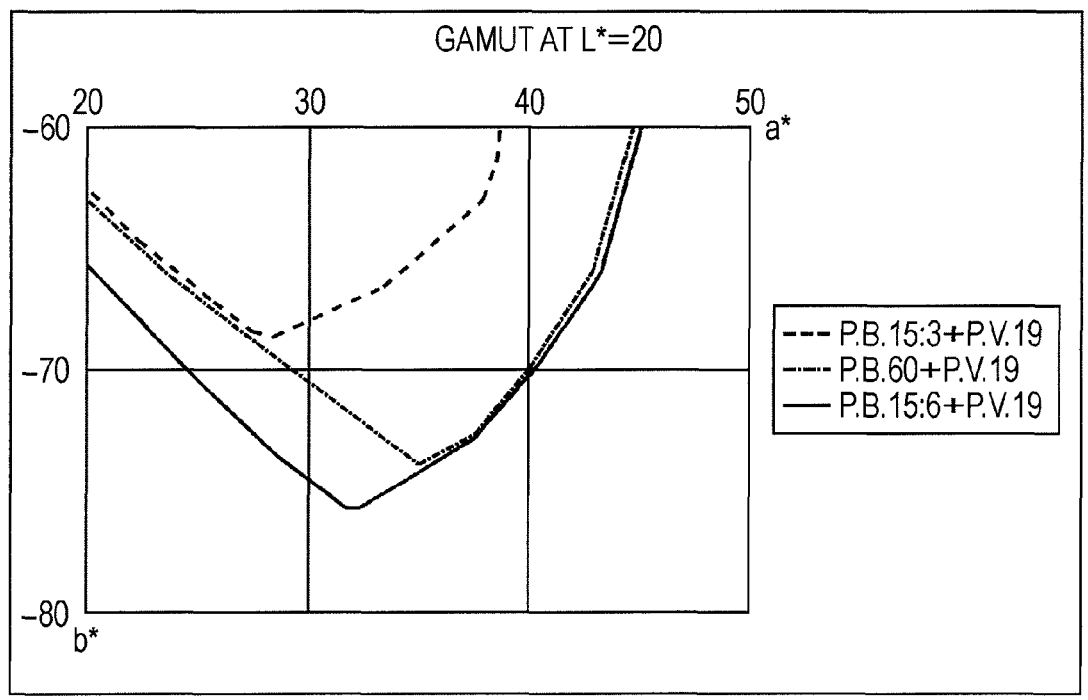
FIG. 1 shows the gamuts (color reproduction ranges) at L*=20 in Examples 1 and 2 and Comparative Example 1.

The invention is an ink set including a cyan ink composition containing, as a pigment, C.I. pigment blue 15:6 or C.I. pigment blue 60, and a magenta ink composition containing, as a pigment, at least one quinacridone pigment selected from the group consisting of C.I. pigment violet 19, C.I. pigment red 122, C.I. pigment red 202, and C.I. pigment red 209, or a quinacridone solid solution pigment formed of at least two selected from the above group.

The cyan ink composition and the magenta ink composition constituting the ink set of the invention will be described in detail below.

1. Pigment

Commercially available C.I. pigment blue 15:6 (hereinafter, abbreviated to "P.B.15:6") and C.I. pigment blue 60 (hereinafter, abbreviated to "P.B.60") can be used in the cyan ink composition of the invention.

Furthermore, commercially available C.I. pigment violet 19 (hereinafter, abbreviated to "P.V.19"), C.I. pigment red 122 (hereinafter, abbreviated to "P.R.122"), C.I. pigment red 202 (hereinafter, abbreviated to "P.R.202"), and C.I. pigment red 209 (hereinafter, abbreviated to "P.R.209") can be used as the quinacridone pigment contained in the magenta ink composition.

The quinacridone solid solution pigment in the invention is formed of at least two selected from the group consisting of P.V.19 (in the solid solution, γ-type P.V.19 is preferred from the viewpoint of chromogenicity), P.R.122, P.R.202, and P.R.209.

The combination composed of two or more quinacridone compounds is not particularly limited, but, in the invention, a solid solution pigment composed of a combination of P.V.19 and P.R.209, a combination of P.V.19 and P.R.122, and a combination of P.V.19 and P.R.202 are preferred from the viewpoint of chromogenicity, and a solid solution pigment composed of a combination of P.V.19 and P.R.202 is particularly preferred.

In the solid solution pigment composed of P.V.19 and P.R.209, the mixture ratio of P.V.19:P.R.209 is preferably within a range of 10:90 to 90:10, more preferably 15:85 to 85:15, and particularly preferably 30:70 to 50:50. In the combination of P.V.19 and P.R.122, the ratio is preferably within a range of 10:90 to 90:10, more preferably 15:85 to 85:15, and particularly preferably 30:70 to 50:50. In the combination of P.V.19 and P.R.202, the ratio is also preferably within a range of 10:90 to 90:10, more preferably 15:85 to 85:15, and particularly preferably 30:70 to 50:50. The solid solution pigment configured by the quinacridone pigment can provide a magenta ink composition that is excellent in color reproduction in red and violet regions of high saturation and high brightness. In particular, a solid solution pigment composed of P.V.19 and P.R.202 in which the weight of the P.V.19 is larger than that of the P.R.202 is particularly excellent in color reproduction in red and violet regions of high saturation and high brightness.

The quinacridone solid solution pigment may be produced by any method without particular limitation and is usually produced by a widely known method. Specifically, a method disclosed in JP-A-11-49998, JP-A-2000-319534, or JP-A-2003-253150 can be used. In the invention, the term "quinacridone solid solution pigment" refers to a pigment existing in a mixed crystal form (a state crystallized in a mixed state) of molecules of a plurality of quinacridone pigments and is different from those prepared by simply mixing two or more types of quinacridone pigments.

Furthermore, whether two or more quinacridone pigments are formed into a solid solution can be easily confirmed by X-ray diffraction analysis. In a mere mixture of two types of quinacridone pigments, the X-ray diffraction pattern is equivalent to the sum of X-ray diffraction patterns of each pigment, and the peak strength is proportional to the blending ratio. On the other hand, in a quinacridone solid solution pigment, the diffraction pattern is original to the newly formed crystal.

In the quinacridone solid solution pigment of the invention, the average particle diameter of the solid solution pigment is preferably in a range of 10 to 200 nm and more preferably 50 to 150 nm. An average particle diameter smaller than 10 nm may cause a decrease in weatherability, and an average particle diameter larger than 200 nm may cause precipitation and unstable ejection.

The content of the pigment in the ink composition of the invention is preferably 0.1 to 15 mass % and more preferably 1 to 10 mass % from the viewpoint of ink reliability such as ejection stability, storage stability, and clogging.

2. Components Other than Pigments

The ink compositions of the invention may each contain any component, in addition to the pigment, without particular limitation and preferably contain the following components.

Any dispersant that can be used in pigment ink can be used without particular limitation, and examples of the dispersant include cationic dispersants, anionic dispersants, nonionic dispersants, and surfactants.

Examples of the anionic dispersants include polyacrylic acid, polymethacrylic acid, acrylic acid/acrylonitrile copolymers, vinyl acetate/acrylic acid ester copolymers, acrylic acid/alkyl acrylate ester copolymers, styrene/acrylic acid copolymers, styrene/methacrylic acid copolymers, styrene/acrylic acid/alkyl acrylate ester copolymers, styrene/methacrylic acid/alkyl acrylate ester copolymers, styrene/α-methyl styrene/acrylic acid copolymers, styrene/α-methyl styrene/acrylic acid/alkyl acrylate ester copolymers, styrene/maleic acid copolymers, vinyl naphthalene/maleic acid copolymers, vinyl acetate/ethylene copolymers, vinyl acetate/fatty acid vinyl ethylene copolymers, vinyl acetate/maleic acid ester copolymers, vinyl acetate/crotonic acid copolymers, and vinyl acetate/acrylic acid copolymers. Examples of the nonionic dispersants include polyvinylpyrrolidone, polypropylene glycol, and vinylpyrrolidone/vinyl acetate copolymers. Examples of the surfactant as the dispersant include anionic surfactants such as sodium dodecylbenzenesulfonate, sodium laurate, and ammonium salts of polyoxyethylene alkyl ether sulfate; and nonionic surfactants such as polyoxyethylene alkyl ether, polyoxyethylene alkyl ester, polyoxyethylene sorbitan fatty acid ester, polyoxyethylene alkyl phenyl ether, polyoxyethylene alkyl amine, and polyoxyethylene alkyl amide. In particular, from the viewpoint of enhancing dispersion stability of the pigment, styrene/(meth)acrylic acid copolymers are preferred. The dispersant may be a water-insoluble vinyl polymer that provides fixability and glossiness, such as one disclosed in JP-A-2007-186641.

The ink composition of the invention preferably contains, as a wetting agent, one or more of polyols, sugars, and polyols having ethylene oxide chains. The addition of the wetting agent prevents drying of ink when the ink is applied to ink jet recording to suppress clogging in the head of an ink jet printer.

Examples of the wetting agent include polyols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; sugars such as sugar alcohols; and polyols having ethylene oxide chains such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether. One or more of them are used.

The ink composition of the invention preferably contains, as a penetrant, one or more of pyrrolidones, alkanediols, and glycol ethers. The addition of the penetrant can enhance wettability to a recording medium and enhance permeability of the ink. Examples of the penetrant include pyrrolidones such as 2-pyrrolidone and N-methyl-2-pyrrolidone; alkanediols such as 1,2-pentanediol and 1,2-hexanediol; and glycol ethers such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether. One or more of them are preferably used.

In addition, each ink composition of the invention preferably contains, as a surfactant, at least one compound selected from the group consisting of acetylene glycols and polysiloxanes. The addition of the surfactant can enhance wettability to a recording medium and enhance permeability of the ink.

Furthermore, each ink composition of the invention may contain an organic solvent having a low boiling point, from the viewpoint of shortening the time for drying the ink. Examples of the low boiling point organic solvent include methanol, ethanol, n-propyl alcohol, iso-propyl alcohol, n-butanol, sec-butanol, tert-butanol, iso-butanol, and n-pentanol, and one or more of them are used. In particular, monovalent alcohol is preferred.

Each ink composition of the invention preferably contains components such as the above-described pigment, dispersant, wetting agent, low boiling point organic solvent, penetrant, and surfactant and contains water as the balance. The water is preferably pure water or ultrapure water, such as ion-exchanged water, ultrafiltrated water, reverse osmosis water, or distilled water. In particular, sterilization of the water by ultraviolet irradiation or hydrogen peroxide can prevent incidence of molds or bacteria over a long period of time, and therefore such sterilized water is preferred.

Each ink composition of the invention may further contain additives according to need, for example, a fixing agent such as water-soluble rosins, a fungicide or antiseptic such as sodium benzoate, an antioxidant or ultraviolet absorber such as allophanates, a chelating agent, an oxygen absorber, or a pH adjuster. One or more of them are used.

A preferred aspect of the magenta ink composition in the invention prepared on the basis of above will be described below.

A diluted aqueous solution (10000 times or less) of the magenta ink composition in the invention preferably has an $L^*$ value of 60 or more and a $b^*$ value of $-17$ or less when the $a^*$ value calculated from the visible absorption spectrum is 80, according to the CIE standard.

In addition, a diluted aqueous solution (10000 times or less) of the magenta ink composition in the invention preferably has an $a^*$ value of 11.5 or more and a $b^*$ value of $-5.5$ or less when the $L^*$ value calculated from the visible absorption spectrum is 94, according to the CIE standard.

The above-mentioned value ranges can be achieved by controlling the quinacridone solid solution pigment in the magenta ink composition so as to have specific components and blending ratios. In the above-mentioned value ranges, the magenta ink composition can have further excellent color reproduction in red and violet regions of high saturation and high brightness, and can exhibit excellent color reproduction in a dark blue region when it is used in an ink set as a combination with a cyan ink composition.

Furthermore, in the above, the $L^*$ value, the $a^*$ value, and the $b^*$ value of the CIE standard calculated from a visible light absorption specimen can be obtained by measuring the transmittance with, for example, a U3300 Hitachi spectrometer under conditions of a scanning speed of 600 nm/min, a measurement wavelength range of 380 to 800 nm, and a slit width of 2.0 nm and performing calculation in a D65 light source and a viewing angle of 2 degrees.

In addition, the magenta ink composition in the invention preferably has an $L^*$ value of 96 or more and an $a^*$ value of 7.5 or more of the CIE standard calculated from the visible absorption spectrum in an aqueous solution of $2 \times 10^{-3}$ g/L pigment. The above-mentioned value ranges can be achieved by controlling the quinacridone solid solution pigment in the magenta ink composition so as to have specific components and blending ratios. Since the quinacridone solid solution pigment has excellent chromogenicity, high color reproduction can be achieved in high saturation and high brightness region even in a relatively low pigment concentration. Since excellent color reproduction can be achieved even in a relatively low pigment concentration, an increase in viscosity due to a high pigment concentration can be avoided. Therefore, even if the pigment concentration is relatively low, the magenta ink composition can exhibit excellent color reproduction in red and violet regions of high saturation and high brightness.

In the case that the magenta ink composition of the invention contain a quinacridone solid solution pigment, the quinacridone solid solution pigment preferably contains a pigment dispersion prepared by a process including a step of preparing a kneaded pigment by kneading the quinacridone solid solution pigment at a temperature higher than 120° C.

The magenta ink composition preferably contains a pigment dispersion prepared by a process including steps of preparing a kneaded pigment by kneading the quinacridone solid solution pigment at a temperature higher than 120° C. and subjecting a composition containing the kneaded pigment to dispersion treatment.

The process preferably further contains a step of ultrafiltration classification after the dispersion treatment.

A solid solution is very rapidly dispersed and is excellent in productive efficiency. However, rapid dispersion causes clogging and uneven chromogenicity. Accordingly, the kneading treatment previous to the microparticle dispersion is effective for preventing clogging. Furthermore, the ultrafiltration classification is effective for preventing unevenness in color. The kneading treatment and ultrafiltration classification can be carried out by the methods described in WO2007/058245.

3. Ink Set

The ink set of the invention is preferably composed of at least four colors of a yellow ink composition, a magenta ink composition, a cyan ink composition, and a black ink composition, from the point of enabling color reproduction in a broad range.

When the ink set of the invention includes a yellow ink composition and a black ink composition, the color materials are not particularly limited, but examples of the color material contained in the yellow ink composition include C.I. pigment yellows 1, 2, 3, 12, 13, 14, 16, 17, 73, 74, 75, 83, 93, 95, 97, 98, 109, 110, 114, 120, 128, 129, 138, 150, 151, 154, 155, 180, 185, and 213. Examples of the color material contained in the black ink composition include carbon blacks (C.I. pigment black 7) such as furnace black, lampblack, acetylene black, and channel black; metals such as copper oxides and iron oxides (C.I. pigment black 11); and organic pigments such as aniline black (C.I. pigment black 1), and carbon black has a relatively small specific gravity to hardly precipitate in water and therefore is preferred for ink jet. These may be used alone or as a mixture. Specifically, carbon black pigments are available, for example, from Mitsubishi Chemical Corporation as No. 2300, No. 900, MCF88, No. 33, No. 40, No. 45, No. 52, MA7, MA8, MA100, No. 2200B, or the like; from Columbia Chemicals Company as Raven 5750, Raven 5250, Raven 5000, Raven 3500, Raven 1255, Raven 700, or the like; from Cabot Corporation as Regal 400R, Regal 330R, Regal 660R, Mogul L, Mogul 700, Monarch 800, Monarch 880, Monarch 900, Monarch 1000, Monarch 1100, Monarch 1300, Monarch 1400, or the like; and from Degussa Company as Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4, or the like. The components and their preparation of the yellow ink composition and the black ink composition can be carried out as in the magenta ink composition.

4. Recording Method and Recording Apparatus

The application of the ink set of the invention is not particularly limited and can be applied to various types of ink jet recording systems. Examples of the ink jet recording systems include thermal jet-type ink jet, piezoelectric-type ink jet, sequential ink jet, roller application, and spray application. In addition, the ink set of the invention can be applied to, for example, recording apparatuses to which the recording systems mentioned above are applied.

In the invention, a recording medium to which droplets from the ink set of the invention adhere is preferably glossy paper for ink jet recording. Here, the term "glossy paper" refers to plain paper having a surface provided with an ink-receiving layer excellent in surface gloss by specific coating. In general, the glossy paper is cast-coated glossy paper having a surface provided with gloss by forming an ink-receiving layer by casting or polymer-coated gloss paper having an ink jet recording layer whose main component is a resin. In addition, as other polymer-coated gloss paper, a recording medium provided with an electro beam curable resin can be used.

Examples

The invention will be described in detail below with reference to Examples, but is not limited thereto.

1. Preparation of Each Ink Composition (C1, C2, C3, M1, M2, Y1, K1)

As shown in the following Table 1, cyan ink compositions (C1, C2, and C3), magenta ink compositions (M1 and M2), a yellow ink composition (Y1), and a black ink composition (K1) were prepared. In Table 1, the content of each component in the compositions is represented by masse, the "dispersant" is a styrene/acrylic acid copolymer, and the "surfactant" is BYK-348 manufactured by BYK Chemie Japan K.K.

Furthermore, the quinacridone solid solution pigment contained in the magenta ink composition M2 was a solid solution formed of γ-type P.V.19 and P.R.202 at a mass ratio of 70:30. The hue of the resulting solid solution pigment showed a magenta color, but the X-ray diffraction pattern thereof was different from that of a mixture of γ-type P.V.19 and P.R.202.

TABLE 1

|  | C1 | C2 | C3 | M1 | M2 | Y1 | K1 |
|---|---|---|---|---|---|---|---|
| Pigment | P.B.15:3 4.0% | P.B.60 4.0% | P.B.15:6 4.0% | P.V.19 5.0% | Solid solution (γ-type P.V.19/P.R.202) 5.0% | P.Y.74 3.5% | Carbon black 2.0% |
| Dispersant | 2.4% | 2.4% | 2.4% | 2.7% | 2.7% | 2.8% | 1.0% |
| Glycerin | 9.0% | 9.0% | 9.0% | 9.7% | 11.0% | 14.0% | 13.0% |
| 1,2-hexanediol | 5.0% | 5.0% | 5.0% | 2.5% | 2.5% | 5.0% | 8.0% |
| Triethanolamine | 0.9% | 0.9% | 0.9% | 0.9% | 0.9% | 0.9% | 0.9% |
| Surfactant | 0.5% | 0.5% | 0.5% | 0.8% | 0.8% | 0.5% | 0.3% |
| Ultrapure water | balance | balance | balance | balance | balance | balance | balance |
| Total | 100% | 100% | 100% | 100% | 100% | 100% | 100% |

2. Evaluation of Ink Set

Printing was carried out using an ink jet printer ("PX-5500", manufactured by Seiko Epson Corporation). An exclusive ink cartridge for cyan (Model: ICC37, manufactured by Seiko Epson Corporation), an exclusive ink cartridge for magenta (Model: ICM37, manufactured by Seiko Epson Corporation), an exclusive ink cartridge for yellow (Model: ICY37, manufactured by Seiko Epson Corporation), and an exclusive ink cartridge for black (Model: ICBK33, manufactured by Seiko Epson Corporation) of the printer were filled with the ink compositions in combinations shown in Table 2 to configure ink sets of Examples and Comparative Examples.

TABLE 2

| | Ink set | | | |
|---|---|---|---|---|
| | Cyan | Magenta | Yellow | Black |
| Comparative Example 1 | C1 | M1 | Y1 | K1 |
| Example 1 | C2 | M1 | Y1 | K1 |
| Example 2 | C3 | M1 | Y1 | K1 |
| Comparative Example 2 | C1 | M2 | Y1 | K1 |
| Example 3 | C2 | M2 | Y1 | K1 |
| Example 4 | C3 | M2 | Y1 | K1 |

The thus prepared ink cartridges were mounted on the printer, and a printing test was carried out using photographic gloss paper ("photo paper (gloss)" manufactured by Seiko Epson Corporation) by printing a colored solid pattern at a duty of 85% or less.

Here, the yellow and black inks were used for finely adjusting the brightness.

In the specification, the term "duty" refers to the value calculated from the following equation:

Duty (%)=(actual number of printed dots)/[(vertical resolution)×(horizontal resolution)]×100

(wherein, the "actual number of printed dots" denotes the actual number of printed dots per unit area, the "vertical resolution" and the "horizontal resolution" each denote resolution per unit area, and a duty of 100% indicates the maximum ink mass of a monochromic color per pixel).

Figure 2:
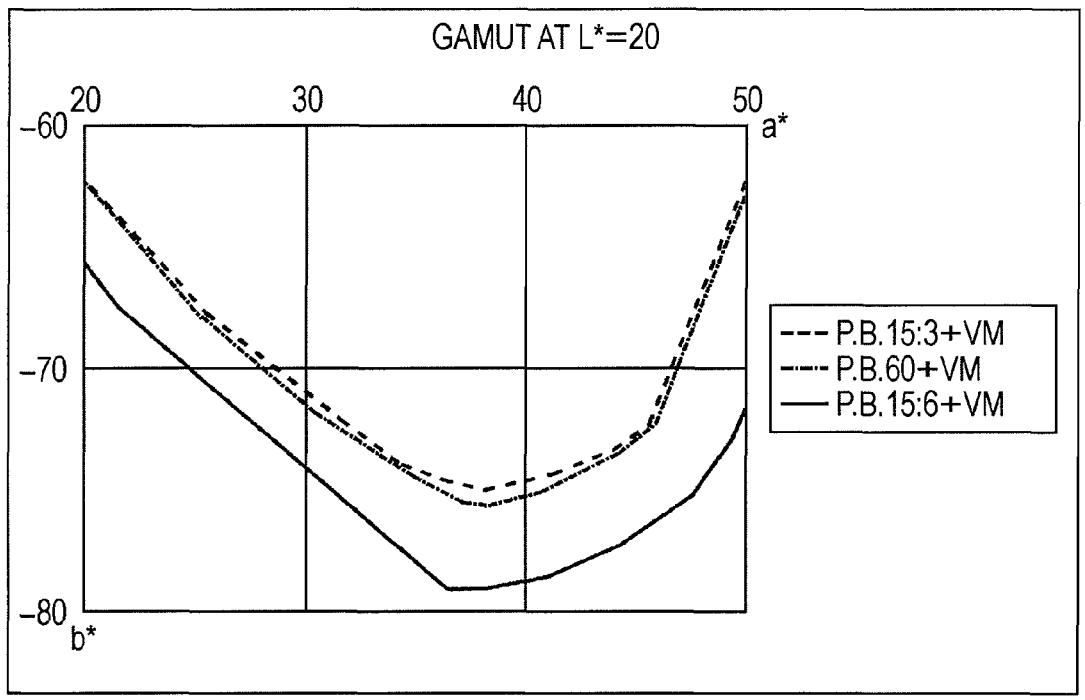
FIG. 2 shows the gamuts (color reproduction ranges) at L*=20 in Examples 3 and 4 and Comparative Example 2.

The CIE/L*a*b* values of the resulting printed matter were measured using a calorimeter (Spectrolino, manufactured by GretagMacbeth GmbH) in compliance with JIS Z8729. FIG. 1 shows the gamuts (color reproduction ranges) at L*=20 in Examples 1 and 2 and Comparative Example 1, and FIG. 2 shows the gamuts at L*=20 in Examples 3 and 4 and Comparative Example 2. The "VM" in FIG. 2 corresponds to the above-described magenta ink M2.

As obvious from FIG. 1, the color reproduction range of the blue region in a dark portion of an L* of 20 or less was significantly extended by using a combination of a cyan ink composition containing P.B.15:6 or P.B.60 as the pigment and a magenta ink composition containing a quinacridone-based pigment, compared to the range in the case of using a cyan ink composition containing P.B.15:3, which has been widely used. In addition, as shown in FIG. 2, a color having an a* value of 30 or more and a b* value of −75 or less at an L* value of 20 or less was reproduced by especially using a combination of a cyan ink composition containing P.B.15:6 as the pigment and a magenta ink composition containing a quinacridone solid solution pigment (VM) as the pigment. Such a color could not been reproduced by known methods.

What is claimed is:

1. An ink set comprising:
   a cyan ink composition containing C.I. pigment blue 15:6 or 60 as a pigment; and
   a magenta ink composition comprising a pigment which is a quinacridone solid solution pigment formed of at least two selected from the group consisting of C.I. pigment violet 19, C.I. pigment red 202, C.I. pigment red 122, and C.I. pigment red 209, wherein the respective cyan and magenta ink compositions can be deposited onto a recording medium to reproduce a color having an a* value of 30 or more and a b* value of −75 or less at an L* value of 20 or less.

2. The ink set according to claim 1, wherein the quinacridone solid solution pigment comprises C.I. pigment violet 19 and C.I. pigment red 202 and is formed such that the weight of the C.I. pigment violet 19 is larger than that of the C.I. pigment red 202.

3. The ink set according to claim 1, wherein the quinacridone solid solution pigment comprises C.I. pigment violet 19 and C.I. pigment red 202 and is formed such that the weight ratio of the C.I. pigment violet 19 to the C.I. pigment red 202 is from 70/30 to 50/50.

4. The ink set according to claim 1, wherein the C.I. pigment violet 19 contained in the quinacridone solid solution pigment is a γ-type.

5. A recording apparatus comprising the ink set according to claim 1.

6. The ink set according to claim 3, further comprising a yellow ink composition and a black ink composition.

7. A method comprising providing the ink set according to claim 1 and depositing the respective cyan and magenta ink compositions onto a recording medium to reproduce a color having an a* value of 30 or more and a b* value of −75 or less at an L* value of 20 or less.

8. Printed matter produced by the method of claim 7.

9. The ink set according to claim 1, wherein the pigment contained in the magenta ink composition is a quinacridone solid solution pigment formed of C.I. pigment violet 19 and C.I. pigment red 202.

10. The ink set according to claim 9, wherein the respective cyan and magenta ink compositions can be deposited on a recording medium to reproduce a color having an a* value of 30 or more and a b* value of less than −75 at an L* value of 20.

11. A method comprising providing the ink set according to claim 9 and depositing the respective cyan and magenta ink compositions onto a recording medium to reproduce a color having an a* value of 30 or more and a b* value of −75 or less at an L* value of 20 or less, wherein the color is not reproducible with a combination of the magenta ink composition and pigment blue 15:3.

12. Printed matter produced by the method of claim 11.

* * * * *